(12) United States Patent
Goldstein et al.

(10) Patent No.: US 7,876,426 B2
(45) Date of Patent: Jan. 25, 2011

(54) OPTICAL TOPOLOGY FOR MULTIMODE AND SINGLEMODE OTDR

(75) Inventors: Seymour Goldstein, Austin, TX (US); J. David Schell, Austin, TX (US)

(73) Assignee: Fluke Corporation, Everett, WA (US)

( * ) Notice: Subject to any disclaimer, the term of this patent is extended or adjusted under 35 U.S.C. 154(b) by 113 days.

(21) Appl. No.: 12/140,248

(22) Filed: Jun. 16, 2008

(65) Prior Publication Data

US 2009/0040509 A1 Feb. 12, 2009

Related U.S. Application Data

(60) Provisional application No. 60/954,543, filed on Aug. 7, 2007, provisional application No. 61/061,604, filed on Jun. 14, 2008.

(51) Int. Cl.
*G01N 21/00* (2006.01)

(52) U.S. Cl. .................................... 356/73.1
(58) Field of Classification Search .............. None
See application file for complete search history.

(56) References Cited

U.S. PATENT DOCUMENTS 5,137,351 A * 8/1992 So ........................... 356/73.1

* cited by examiner

*Primary Examiner*—Tu T Nguyen
(74) *Attorney, Agent, or Firm*—patenttm.us

(57) ABSTRACT

A network test instrument for singlemode and multimode OTDR testing employs an optical topology providing for combined singlemode and multimode use of a detector for reduced cost and instrument size.

18 Claims, 6 Drawing Sheets

OPTICAL TOPOLOGY FOR MULTIMODE AND SINGLEMODE OTDR

CROSS-REFERENCE TO RELATED APPLICATIONS

This application claims priority from U.S. provisional application 60/954,543 filed Aug. 7, 2007, and from U.S. provisional application 61/061,604 filed Jun. 14, 2008.

BACKGROUND OF THE INVENTION

This invention relates to test and measurement, and more particularly to test instruments for optical time domain reflectometry (OTDR).

Two types of fibers are in typical use in optical fiber communications, singlemode and multimode fibers. Singlemode fibers employ a more narrow core (relative to multimode) wherein light rays travel therethrough as single rays. Multimode fibers have a larger diameter and light propagates therethrough in multiple rays.

Typically, singlemode fiber systems employ light sources at 1310 nm and 1550 nm, while multimode fiber systems employ light sources of 850 nm and 1300 nm.

OTDR testing of fiber optic communication systems is employed to locate and characterize reflective and loss events in optical fibers. In accordance with the prior art, to provide testing capability of optical time domain reflectometry to test both singlemode and multimode fiber systems, test instrument costs become prohibitive because of required redundancy in electro-optic components.

SUMMARY OF THE INVENTION

In accordance with the invention, an OTDR test instrument employs an optical topology that is configured to reduce redundancies.

Accordingly, it is an object of the present invention to provide an improved OTDR optical topology for a test instrument.

It is a further object of the present invention to provide an improved test instrument for OTDR that accomplishes singlemode and multimode fiber testing at reduced cost.

It is yet another object of the present invention to provide an improved method of testing both singlemode and multimode fiber optic systems with a single test instrument.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises an optical topology employed in an OTDR test instrument to provide singlemode and multimode testing capability.

Figure 1:
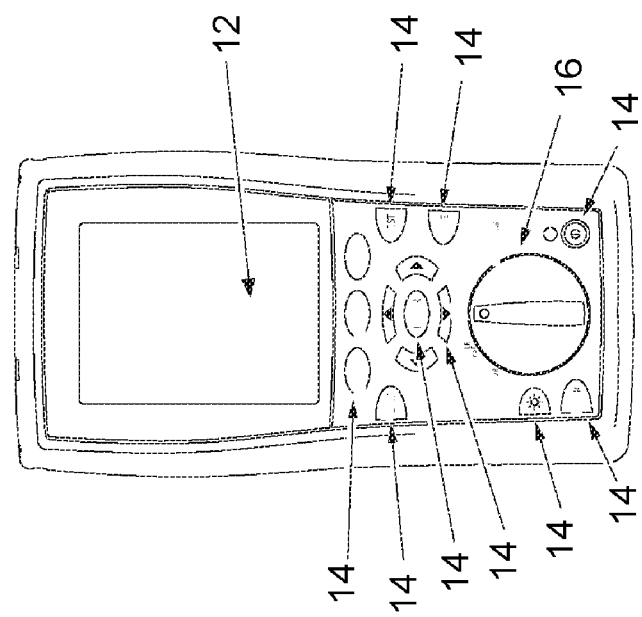
FIG. 1 is a top view of an exemplary test instrument for OTDR testing.

Referring to FIG. 1, a top view of an exemplary test instrument for OTDR testing, the test instrument 10 is suitably sized to be portable or handheld, and employs a display 12, various function control buttons 14 including cursor control, power, test start, save, backlight for display control, etc. A rotary switch 16 may also be provided for mode selection, for example.

Figure 2:
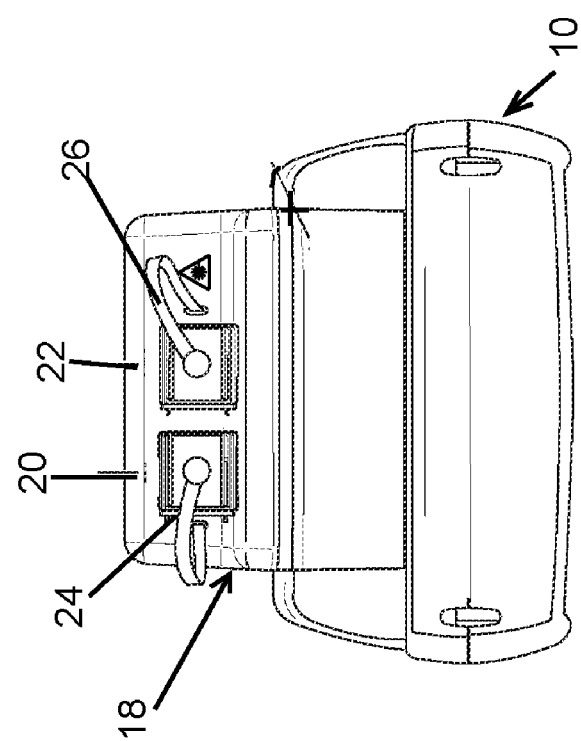
FIG. 2 is an end view of the test instrument for OTDR testing.
Figure 3:
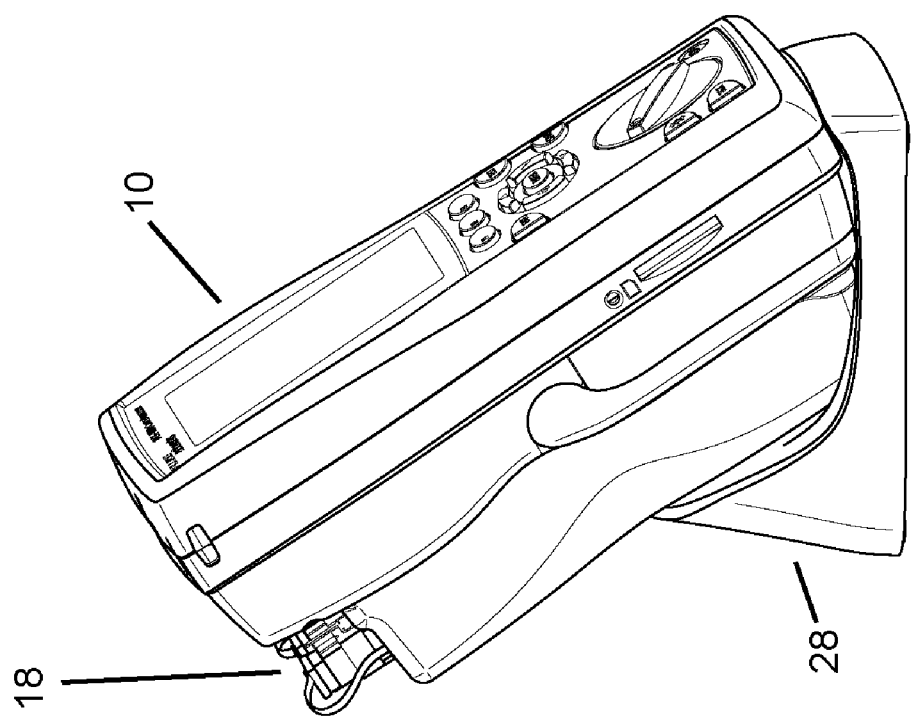
FIG. 3 is a side view of the test instrument for OTDR testing.

Referring to FIG. 3, a side view of the test instrument 10, a removable OTDR test module 18 is detachably engaged with the test instrument 10, providing OTDR testing capability. A cradle 28 may be employed to position the test instrument in a convenient manner for use in certain situations. FIG. 2 is an end view of the test instrument 10 with OTDR test module 18 installed, illustrating the connection arrangement for attaching the instrument to an optical fiber system under test. A singlemode port 20 and multimode port 22 are provided to connect to the respective fibers. The connectors are suitably SC connectors, (although could be any kind such as ST, FC, LC) which are standardized fiber optic connector with a push-pull latching mechanism. These connectors allow easy insertion and removal and ensure a positive connection. Protective caps 24, 26 are provided for covering the connectors when not in use.

Figure 4:
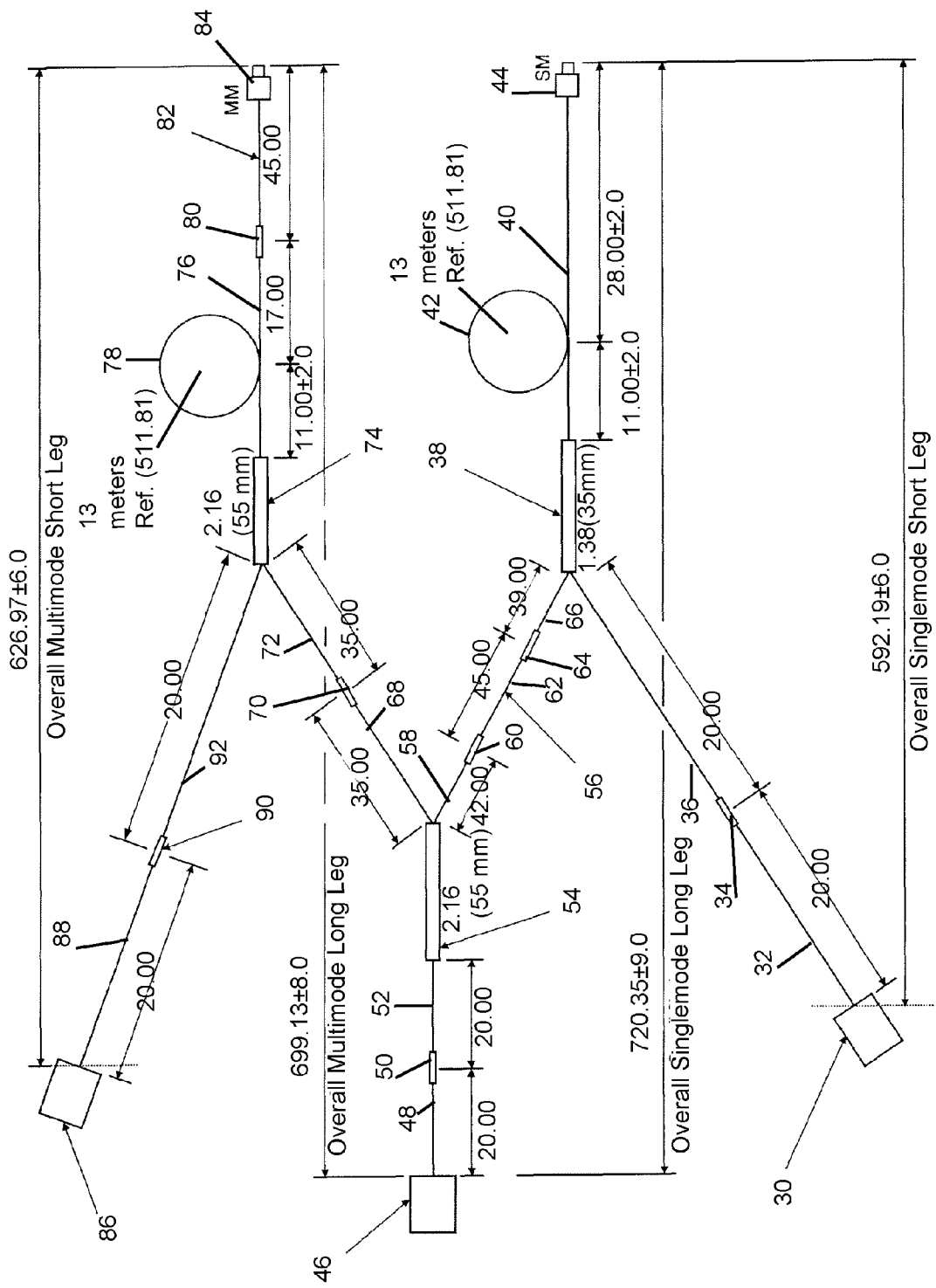
FIG. 4 is a schematic diagram of the optical topology of the exemplary test instrument.

FIG. 4 is a schematic diagram of the optical topology employed in the preferred embodiment of the test instrument. The topology employs shared and separate portions for singlemode and multimode operation. Singlemode pulse laser combiner 30 incorporates singlemode laser pulse sources for providing test pulses at the appropriate wavelengths, 1300 nm and 1550 nm in the particular embodiment (although, of course, other wavelengths could be used), connected via optical fiber 32, splice 34 and optical fiber 36 to one of the two-port side ports of 1×2, 50/50, 1310/1550 nm single mode coupler 38. The other side of the coupler 38 (the single-port side) connects to a fiber pigtail assembly 40 which includes a loop 42 which is a length of fiber spooled into a manageable loop diameter, ending in connector 44 corresponding to connector 20 of FIG. 2, for attachment with a singlemode fiber system under test.

An Avalanche Photodetector (APD) 46 is provided for detection of return pulses and connects via optical fiber 48, splice 50 and optical fiber 52 to a single-port side of coupler 54, suitably a 1×2 50/50, 850/1310 nm multi mode coupler. One of the two-port side ports of coupler 54 is connected to the second port of the two port side of coupler 38, suitably by use of a launch fiber 56, which comprises fiber 58, splice 60, fiber 62, which is a step index fiber, splice 64 and fiber 66.

The detector 46, fibers and couplers 32, 36, 38, 40, 42, 48, 52, 54, 58, 62, 66, and splices 34, 50, 60, 64 and connector 44 and source 30 comprise the singlemode test optical path.

The second port of the 2 port side of 1×2 coupler 54 connects via fiber 68, splice 70 and fiber 72 to 1×2, 50/50, 850/1310 nm multimode coupler 74, the single-port side of coupler 74 connecting to a fiber pigtail assembly 76 which includes a loop 78, comprising a length of fiber spooled into a manageable loop diameter, a splice 80, fiber 82 and ending in connector 84 corresponding to connector 22 of FIG. 2, for attachment with a multimode fiber system under test.

The second port of the two-port side of coupler 74 is connected to multimode source 86, comprising a multimode pulsed laser combiner providing 850 nm and 1300 nm source to the coupler 74 via optical fiber 88, splice 90 and optical fiber 92.

The detector 46, fibers and couplers 48, 52, 54, 68, 72, 74, 78, 82, 88, 92 and splices 50, 70, 80, 90 and connector 84 and source 86 comprise the multimode test optical path.

Figure 5:
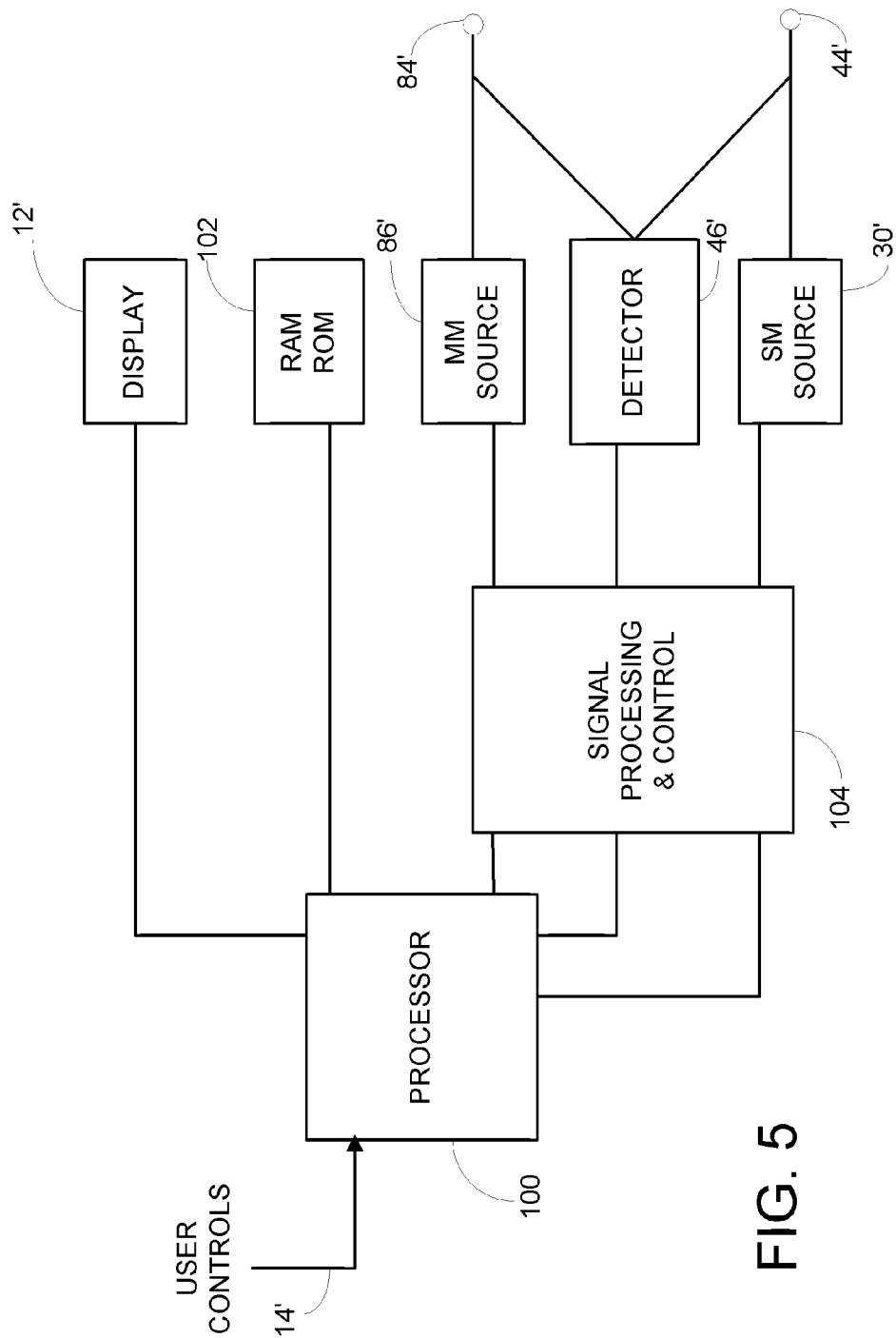
FIG. 5 is a block diagram of an OTDR test instrument.

FIG. 5 is a block diagram of the OTDR test instrument, wherein a processor 100 includes memory (RAM/ROM) 102, user controls 14' and display 12' interfacing with the processor for providing user interface. Multimode source 86' and singlemode source 30' interface with the processor 100, as does detector 46', via signal processing and control block 104, providing timing control between the processor and sources 30', 86' and detector 46'. Output from source 86' is provided to connector 84', output from source 30' is provided to connector 44', and input from connectors 44' and 84' is provided to detector 46'.

In operation, the processor 100 governs the test instrument in cooperation with the user via user controls 14' and display 12' to effect OTDR test operations on optical fiber systems interfaced with connectors 84' and 44', wherein test pulses are sent via the sources 30' and 86' to the respective connectors 44' and 84', and return pulses are received by detector 46'. Under control of processor 100, the instrument is operated to provide OTDR testing and measurement, and results thereof may be stored in memory 102 and/or displayed to display 12'. Test data, operation commands may also be sent and received external of the instrument via optical, electrical or wireless interfaces, for example.

Figure 6:
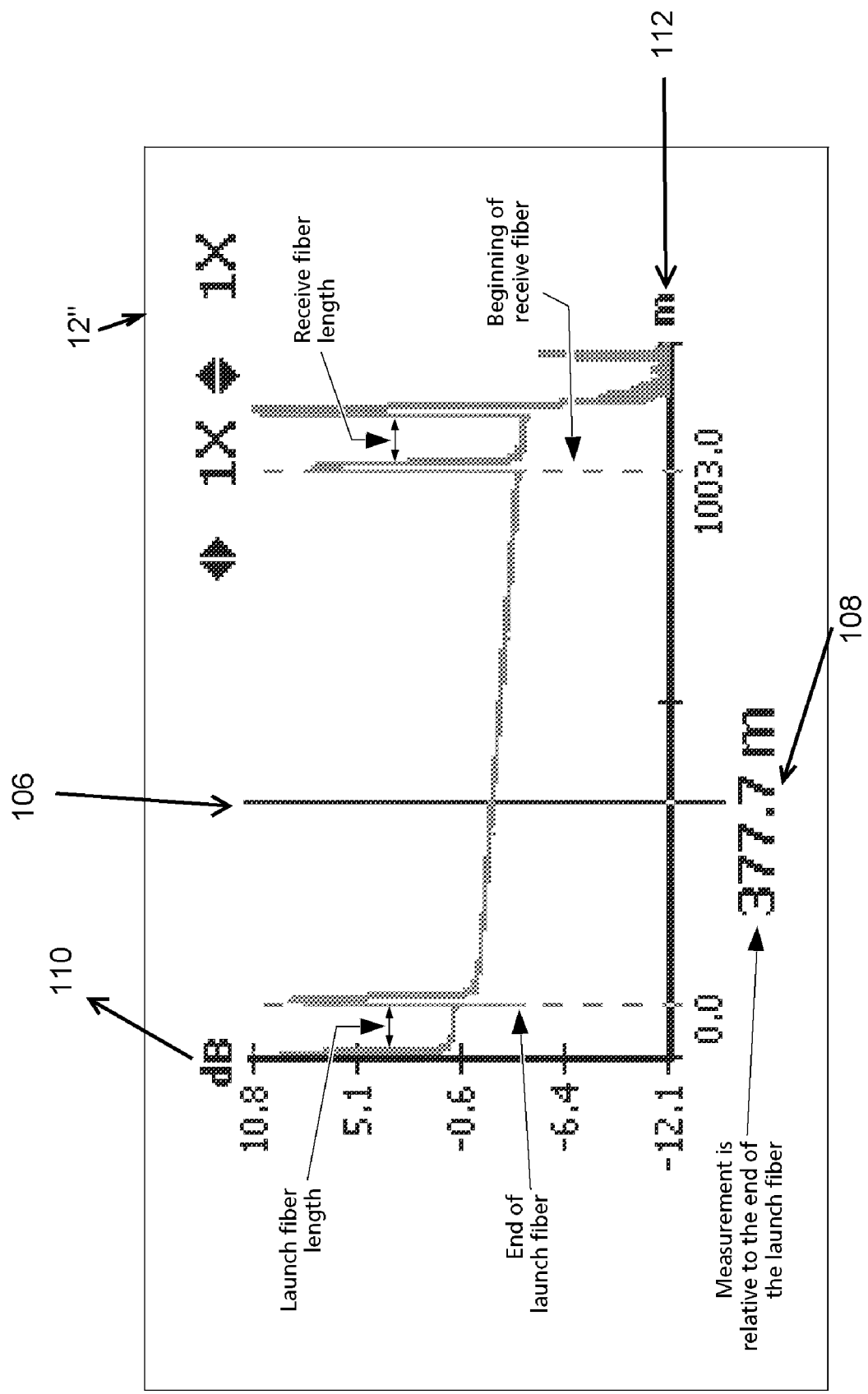
FIG. 6 is an example display from and OTDR test operation.

FIG. 6 is an example of a display trace that the test instrument 10 could present to the user on display 12" for an OTDR measurement. In this view, launch and receive fibers have been employed at the test instrument end and the remote end of the optical fiber cabling that is being tested. The display trace illustrates the overall length of the cable, cursor 106 (with a length value 108 showing the length position of the measurement cursor relative to the cable length), signal strength axis 110 and length axis 112. The beginning of the receive fiber is illustrated with the value 1003.0 meters shown below.

Referring again to FIG. 4, exemplary length values are given for the various sections of optical fibers in the optical topology, with values in inches unless otherwise noted. Loops 42 and 78 provide separation between the trigger and the incoming pulses to the receiver 46, to avoid the receiver getting noise and also to provide separation of any reflection within the harness. Measuring the loss and/or reflection of the bulkhead connector provides an indication of the quality of the connection to the network. Loops 42 and 78 also can provide an optical delay to provide additional time such that measurements may be accomplished with a given speed of processing and electronic components speed considerations. The overall length of the illustrated embodiment for singlemode source 30 to connector 44 is 592.19 inches, ±6.0 inches. The overall length of the illustrated embodiment from singlemode connector 44 to detector 46 is 720.35 inches, ±9.0 inches. The overall length of the illustrated embodiment for multimode source 86 to connector 84 is 626.97 inches, ±6.0 inches. The overall length of the illustrated embodiment from multimode connector 84 to detector 46 is 699.13 inches, ±8.0 inches.

Accordingly, with the test instrument optical topology, an OTDR test instrument is provided that is capable of both singlemode and multimode measurement operations, with lower cost by reduction of sensing components required.

While a preferred embodiment of the present invention has been shown and described, it will be apparent to those skilled in the art that many changes and modifications may be made without departing from the invention in its broader aspects. For example, the specific test wavelengths noted above for the preferred embodiment can be changed, and the specifics of the couplers 38, 54 and 78 may be modified to employ couplers having different split percentages (e.g., 40/60, etc., instead of 50/50, and different wavelength specification, e.g., 1310/1490 nm instead of 1310/1550). The appended claims are therefore intended to cover all such changes and modifications as fall within the true spirit and scope of the invention.

What is claimed is:

1. A singlemode and multimode optical fiber test instrument, comprising:
   a singlemode test signal source coupled to a singlemode connector for attachment to a singlemode optical fiber under test to provide test signals thereto;
   a multimode test signal source coupled to a multimode connector for attachment to a multimode optical fiber under test to provide test signals thereto; and
   a detector concurrently coupled to the singlemode connector and the multimode connector for receiving response signals from one or both of the singlemode connector and the multimode connector.

2. The test instrument as claimed in claim 1, wherein said detector is coupled to the singlemode connector via a connection comprising a step index fiber, whereby said step index fiber transforms the singlemode return signal into a multimode signal compatible with a multimode return path.

3. The test instrument as claimed in claim 1, further comprising a multimode connector, wherein said detector is coupled to the singlemode connector via a connection comprising said multimode connector and said step index fiber.

4. A method for operating an optical time domain reflectometry test instrument, comprising:
   providing a singlemode test source to a singlemode fiber under test via a single mode interface;
   providing a multimode test source to a multimode fiber under test via a multimode interface; and
   providing a common detector concurrently connected to said singlemode interface and said multimode interface for detecting signals from either or both of said singlemode fiber under test and said multimode fiber under test.

5. The method according to claim 4, wherein said providing a common detector concurrently connected further comprises providing a common path from said common detector to a coupler and separate paths from said coupler to said multimode fiber under test and said singlemode fiber under test.

6. The method according to claim 5, further comprising providing a step index fiber as a portion of said path from said coupler to said singlemode fiber under test.

7. The method according to claim 6, wherein said coupler comprises a multimode coupler.

8. The method according to claim 5, wherein said coupler comprises a multimode coupler.

9. The method according to claim 8, wherein said coupler comprises a multimode coupler.

10. An optical test instrument optical topology, comprising:
    a multimode optical test source coupled to a multimode interface for connection to optical fiber under test;
    a singlemode optical test source coupled to a singlemode interface to optical fiber under test;
    an optical signal detector connected to said multimode interface and said singlemode interface via a multimode connector for receiving signal from said multimode interface or said singlemode interface to optical fiber under test.

11. The optical test instrument topology according to claim 10, wherein said optical signal detector is concurrently connected to both said singlemode optical interface and said multimode optical interface.

12. The optical test instrument topology according to claim 10, further comprising a step index fiber, wherein said detector further connects to said singlemode optical interface via said step index fiber for converting from singlemode to graded index multimode optics.

13. The optical test instrument topology according to claim 12, wherein said multimode connector is optically positioned between said detector and said step index fiber.

14. The test instrument as claimed in claim 12, further comprising a multimode connector, wherein said multimode connector is positioned between said detector and said step index fiber.

15. An optical test instrument optical topology, comprising:
   a multimode optical test path to a multimode interface for connection to an optical fiber under test;
   a singlemode optical test path coupled to a singlemode interface for connection to an optical fiber under test;
   an optical signal detector concurrently coupled to said multimode optical test path and said singlemode optical test path.

16. The optical test instrument topology according to claim 15, wherein said optical signal detector couples to said singlemode optical test path and said multimode optical test path via a multimode coupler interfaced with said detector, said singlemode optical test path and said multimode optical test path.

17. The optical test instrument topology according to claim 16, wherein said singlemode optical test path includes a step index fiber between said multimode coupler and said singlemode interface.

18. The optical test instrument topology according to claim 15, wherein said optical signal detector concurrently couples to said singlemode optical test path and said multimode optical test path via a multimode coupler interfaced with said detector, said singlemode optical test path and said multimode optical test path, and wherein said singlemode optical test path includes a step index fiber between said multimode coupler and said singlemode interface for conversion of an incoming optical signal from a singlemode to a graded index multimode optics.

* * * * *